May 7, 1946.  J. R. CLARK  2,399,664
KILN FOR BRICK AND OTHER CLAY PRODUCTS
Filed March 22, 1939  8 Sheets-Sheet 2

Inventor
John R. Clark,
By Bernard F. Garvey
Attorney

May 7, 1946.  J. R. CLARK  2,399,664
KILN FOR BRICK AND OTHER CLAY PRODUCTS
Filed March 22, 1939  8 Sheets-Sheet 6

Inventor
John R. Clark,

May 7, 1946. J. R. CLARK 2,399,664
KILN FOR BRICK AND OTHER CLAY PRODUCTS
Filed March 22, 1939 8 Sheets-Sheet 8

Inventor
John R. Clark,
By Bernard F. Garvey
Attorney

Patented May 7, 1946

2,399,664

UNITED STATES PATENT OFFICE 2,399,664

KILN FOR BRICK AND OTHER CLAY PRODUCTS

John R. Clark, Bethesda, Md.

Application March 22, 1939, Serial No. 263,507

14 Claims. (Cl. 25—134)

My invention relates to kilns for use in the manufacture of brick and other clay products, this being a continuation in part of my prior allowed application, Serial No. 109,597, filed November 6, 1936, it being an object of my invention to provide a compact kiln which can be operated with a minimum expenditure of time and labor and which includes a novel method of drying, heating, firing and burning the ware.

It is also an object of this invention to provide a self contained kiln which is preferably of circular or like construction, having the ware forming mechanism arranged within the confines of a kiln and in direct communication with the latter so that the formed ware may be immediately transported to the kiln and set up on the kiln floor preparatory to drying, preheating and firing. It is also within the contemplation of this invention to employ a kiln in which the floor is stationary with hoods or covers mounted thereover which are movable to permit variation in the treatment of the ware located in different zones on the kiln floor, every portion of the floor, upon which the ware is tiered, being perforate to permit the passage of heat therethrough after impingement with the ware.

After much experiment, I have found that a continuous kiln divided into chambers, all of which latter communicate with a common flue, the chambers intercommunicating, by way of the flue, in conjunction with the use of dampers or baffles, tends to facilitate transfer of heat, at the option of the operator, into any of the chambers. The heat is interchanged between the chambers through the instrumentality of suction means interposed at predetermined points in the flue, the suction means being mobile to permit movement complementing the movement of the portable kiln chamber hoods forming a part of this invention.

It is also an object of this invention to provide top and end seals for the chamber partitions which may be moved into engagement with or disengagement from the partitions, the seals, when in a closed position, effectively preventing the passage of heat from one chamber to another, between the hoods and partitions.

I have found that best results are obtained by introducing heat near the top of the firing chamber permitting the heat to permeate the tiered brick from top to bottom, the heat being withdrawn through the perforate floor of the chamber into a continuous flue, which latter is in communication with all of the chambers.

Other objects of the invention will be manifest from the following description of the preferred forms of the invention, taken in connection with the accompanying drawings, wherein:

Fig. 17 is a detail fragmentary sectional view of the modified form of partition, taken on the line 17—17 of Fig. 15, looking in the direction of the arrows.

With the device of the present invention, it is contemplated that the kiln be constructed at the source of supply for the ware to be manufactured. The present invention has, after much experiment, been worked out to a point where the clay may be loaded in cars, at the source of supply, transported into a clay preparing unit, there dumped and prepared for the ware forming apparatus, the ware being transported from the latter to the kiln floor for the final operation of setting and drying, preheating and burning. This method of manufacture is one continuous operation.

Figure 2:
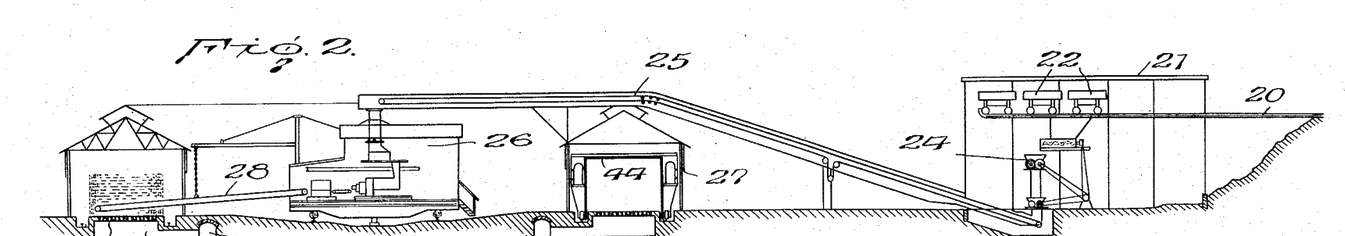
Fig. 2 is a diagrammatical view of the entire plant, parts of which are shown in side elevation and parts in section.
Figure 3:
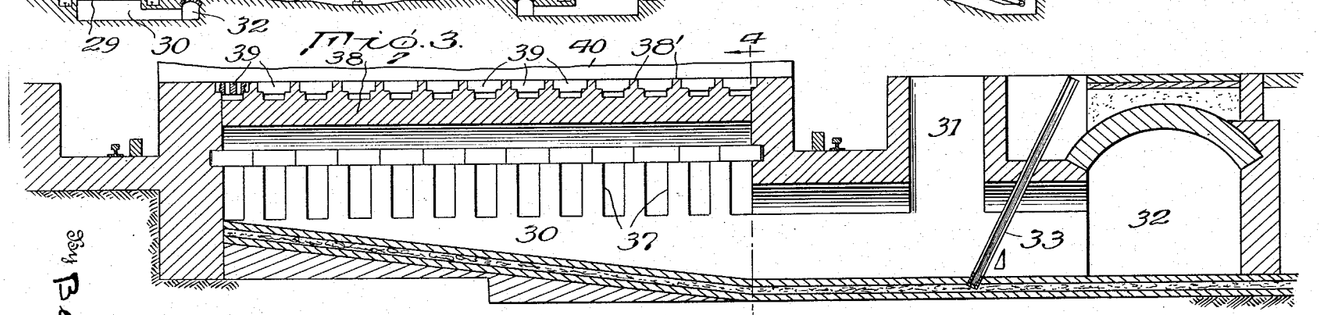
Fig. 3 is a detail enlarged fragmentary sectional view taken through one of the kiln chambers illustrating to advantage the manner in which the kiln chambers communicate with the flue or conduit, the hood carrying tracks being shown in section on opposite sides of the kiln chamber floors.
Figure 4:
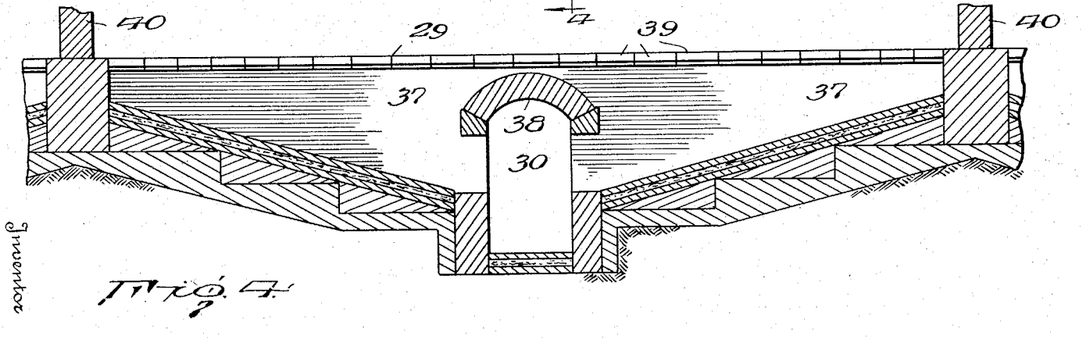
Fig. 4 is a detail vertical sectional view taken on the line 4—4 of Fig. 3, looking in the direction of the arrows, and showing to advantage the sub-floor structure of one of the kiln chambers.

In Fig. 2, I have diagrammatically illustrated a plant as now used for the manufacture of brick in accordance with the teaching of the present invention. The plant comprises tracks 20 extending from the source of clay supply into a preparing unit 21. The clay is transported into dump cars 22, which latter are adapted to permit gravitation of the clay therefrom into engagement with a grating 23, the latter being superposed over clay preparing mechanism, generally designated 24, and including a granulator and disintegrator. The clay drops from the mechanism 24 to a belt 25, one end of which latter is positioned directly beneath the mechanism 24 in the clay preparing unit 21. The belt 25 carries the prepared clay to a ware forming unit 26 located at a point remote from the clay preparing unit. The unit 26 is circumscribed by a continuous circular kiln, generally designated 27 and shown advantageously in Fig. 2 of the drawings. The belt 25 rises up over the top of said kiln so that the prepared clay may pass uninterruptedly from the clay preparing unit 21 to the ware forming unit 26. After the ware has been formed in the unit 26, it is conveyed by a belt or the like 28 to the floor of the kiln 27.

The ware may be tiered on the kiln floor in any desired manner. I have found it preferable to arrange a predetermined number of tiers of brick in superimposed relation on the kiln floor, after which the belt or conveyor 28 is retracted and ware fed to another part of the kiln. This may be conveniently done by rotating the ware forming unit 26 so as to bring the conveyor 28 into operative proximity to the part of the kiln floor upon which the brick is next to be tiered. This operation is repeated until the desired number of tiers have been erected and the ware dried, pursuant to which the tiered ware is preheated, fired and cooled in succession in a manner more fully hereinafter set forth.

The kiln floor, indicated at 29, and illustrated to advantage in Figs. 1, 3, 4 and 5, is of circular continuous construction and perforate to permit the passage of heat therethrough. The perforations in the floor of each chamber communicate with ducts or passageways 30, formed immediately therebeneath, the ducts being also in communication with suction outlets 31 and an annular continuous flue 32. Between the outlets 31 and flue 32, damper guides 33 are positioned which are adapted for the reception of dampers 34. The dampers are available to deflect the heat, suctioned from the kiln chambers through the ducts 30, into the outlet 31.

The floor 29 is of multi-part construction, each part forming the bottom of a chamber, the latter being more fully hereinafter described. Said floor parts, one of which is shown to advantage in Fig. 5 and designated 35, are provided with tangential openings 36. These openings communicate, through openings between featherwalls 37, with the ducts 30. The featherwalls extend laterally from arches 38, each of the latter being subjacent a floor part 35 and constituting the top of one of the ducts 30. The floor parts are equipped on their upper faces with guide strips 38' which latter are parallelly arranged on opposite sides of the openings 36. Cellular blocks 39 are slidably mounted between the guide strips, the voids in the blocks communicating with the openings 36. The tops of the blocks 39 are uniplanar with the upper margins of the strips 38', providing a relatively smooth uninterrupted surface upon which the brick are tiered.

Figure 1:
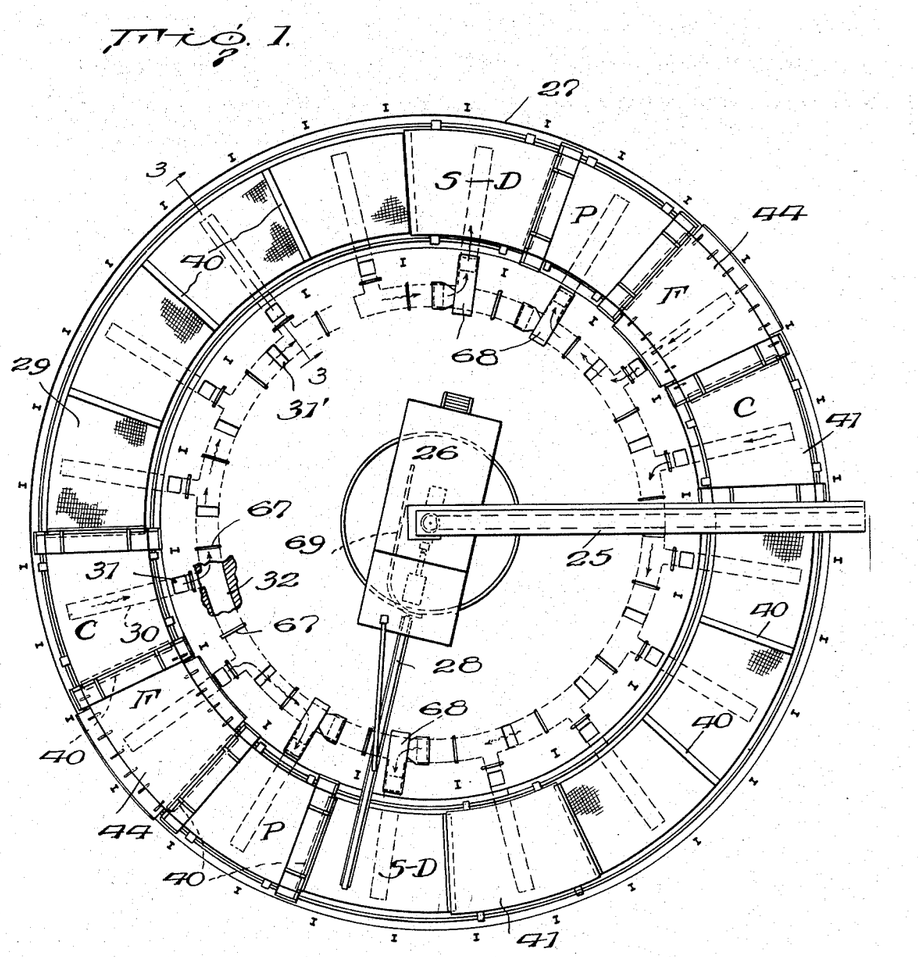
Fig. 1 is a top plan view of a kiln constructed in accordance with the present invention, the clay conveyor being shown fragmentarily, and a portion of the continuous heat flue or conduit being also fragmentarily shown to disclose details.
Figure 1A:
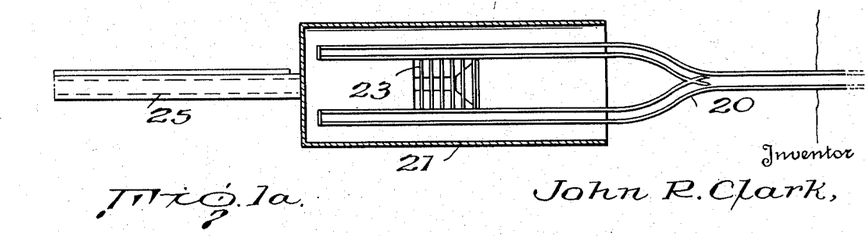
Fig. 1a is a continuation of Fig. 1, showing in top plan, the clay conveyor extending into the clay preparing unit, the latter being shown in fragmentary section, the tracks upon which the clay is transported in dump cars into the clay preparing unit, as well as the grating upon which the clay is dumped, being also shown in top plan over the clay preparing mechanism.

The kiln floor 29 is provided, at intervals, with partitions 40 which co-act with hoods, generally designated 41, to provide chambers. Preferably, these chambers are arranged in batteries of four, as illustrated in Fig. 1 of the drawings. Each battery consists of a setting and drying chamber S—D, a preheating chamber P, a firing chamber F and a cooling chamber C. The hoods are equipped with rollers 42 which are mounted on tracks 43, the tracks extending around the kiln, on both sides of the kiln floor 29. This permits the hoods to be moved with facility, at the option of the operator.

Figure 6:
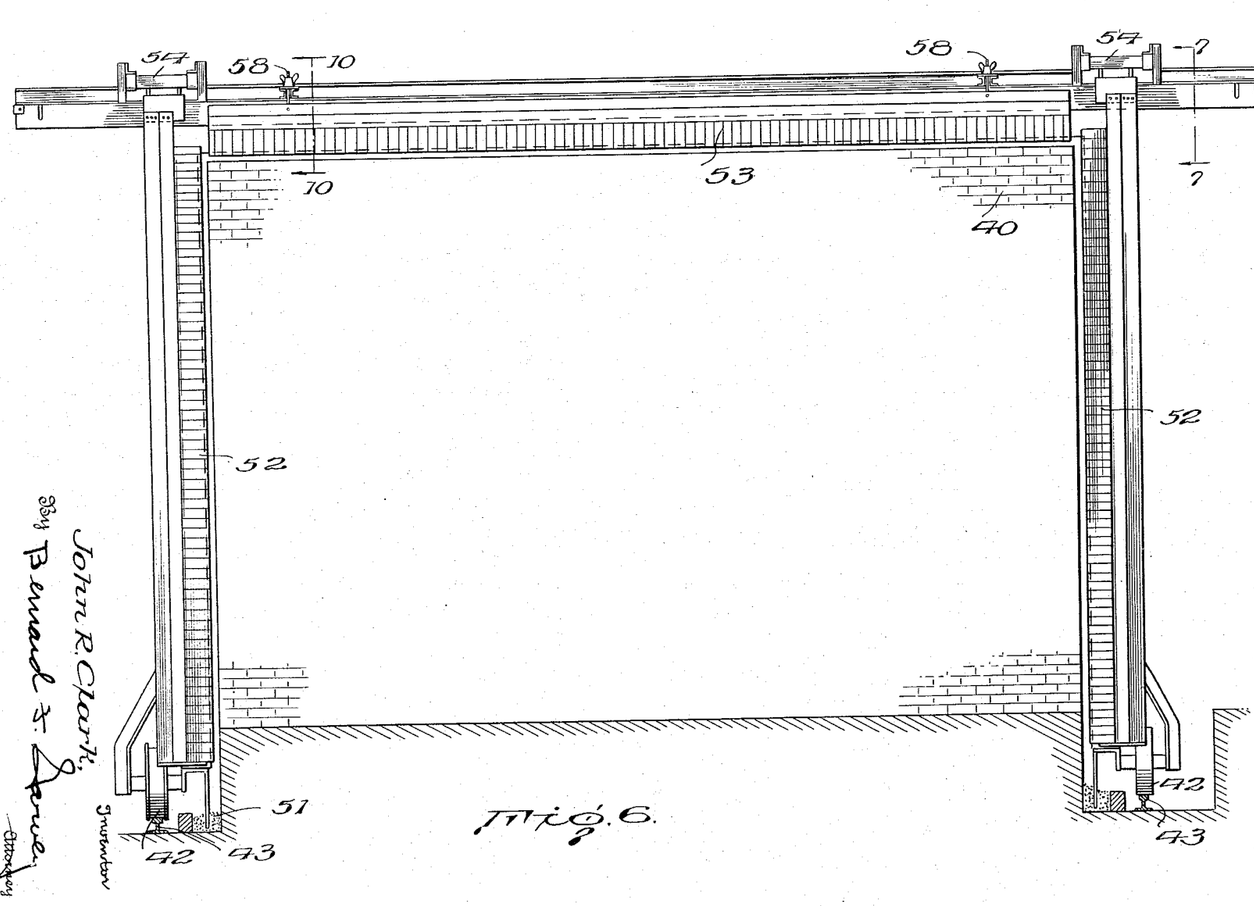
Fig. 6 is an elevational view of one of the kiln chambers showing a partition wall with the seals arranged in proximity to the marginal edges of the wall.
Figures 7, 8, 9:
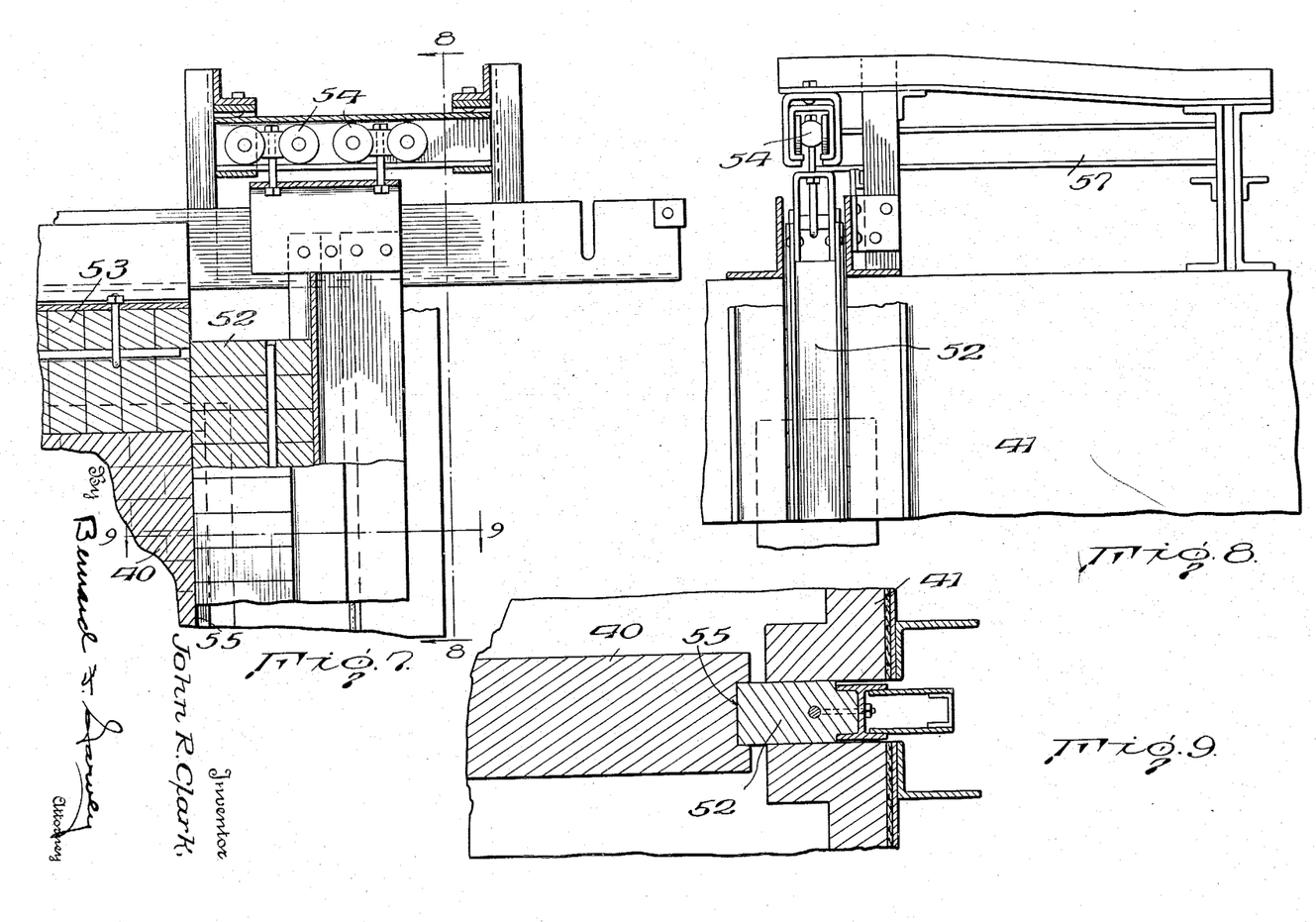
Fig. 7 is a detail fragmentary sectional view taken on an enlarged scale on the upper right hand portion of Fig. 6, showing to advantage the manner of mounting one of the partition seals, the latter being closed.
Fig. 8 is a detail fragmentary vertical sectional view taken on the line 8—8 of Fig. 7, and corresponding to an enlarged scale, taken on line 8—8 in Fig. 6, looking in the direction of the arrows, the seal mounting being shown in end elevation.
Fig. 9 is a detail fragmentary transverse sectional view taken on the line 9—9 of Fig. 7, looking in the direction of the arrows, showing the end seal in closed position.
Figures 10, 11, 12, 13:
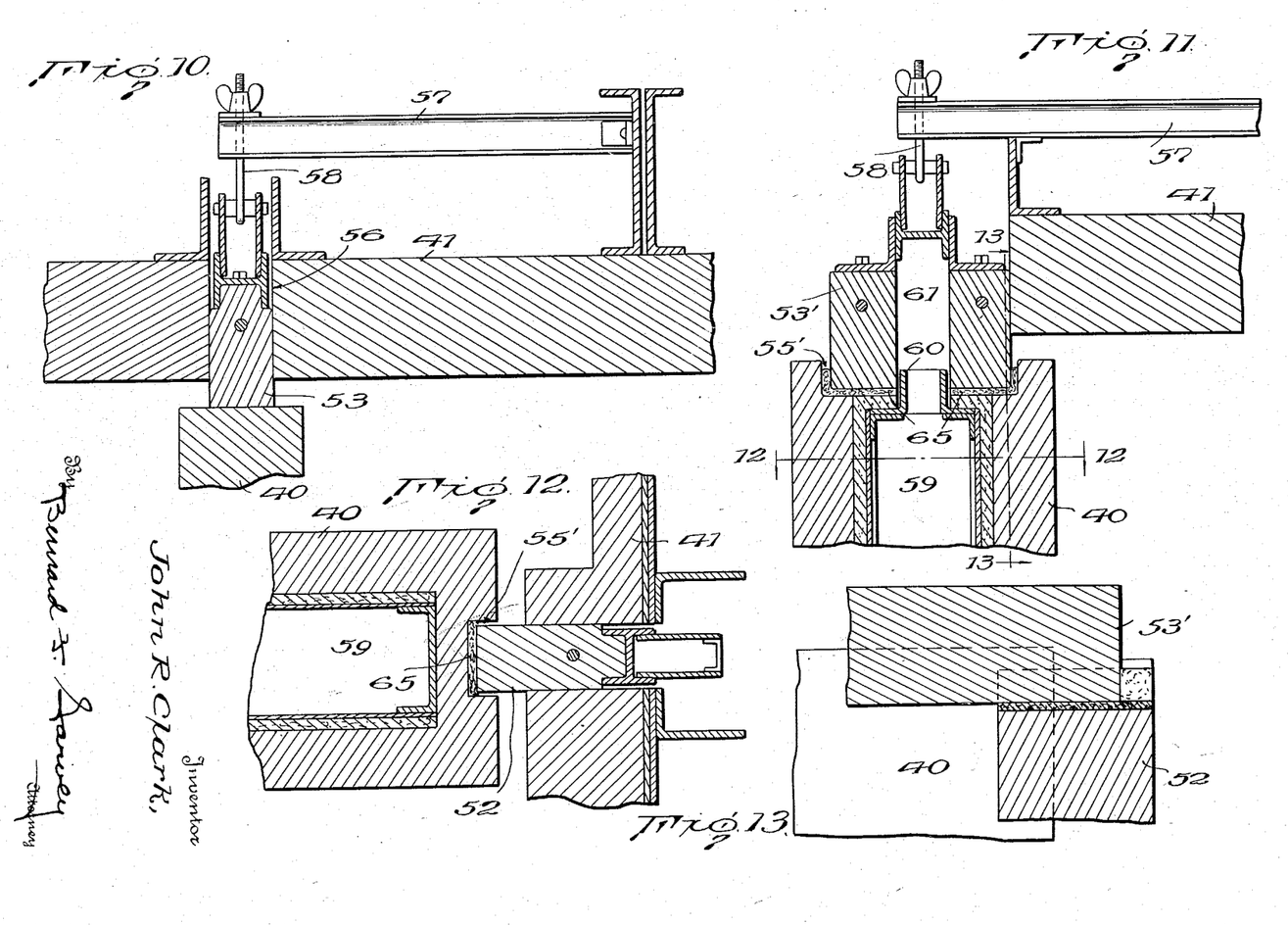
Fig. 10 is a detail fragmentary vertical sectional view taken on the line 10—10 of Fig. 6, looking in the direction of the arrows, showing one of the top seals in a closed position.
Fig. 11 is a similar view to that shown in Fig. 10, showing a modified form of partition and top seal.
Fig. 13 is a fragmentary sectional view taken on the line 13—13 of Fig. 11, looking in the direction of the arrows.

The hoods, with the exception of the firing hood 44, are of substantially uniform construction. In this hood firing openings 45 are formed near the crown of the hood. Through these openings the heating gases are introduced for impingement against brick tiered in this chamber. Peep or sight openings 46 are also formed at intervals in this hood. A suitable operator supporting platform 47 is mounted on each side of the firing hood. The platforms are fixedly secured to the hood in convenient accessibility to the openings 45 and 46. If desired, each side wall of the firing hood may be extended inwardly, at its lower extremity, to provide a rib 48 which complements and is engageable in a groove 49 formed in the side of the kiln floor base. By this construction a bottom seal is provided to better retard the escape of heating gases from the chamber. It has also been found advantageous to append a flange 50 from the bottom margin of each side wall of the hoods. These flanges, as shown to advantage in Fig. 6, extend into sand beds 51 thereby providing sand seals between the chamber floors and hoods.

Additionally, to prevent the escape of the heating gases from the chambers, suitable movable seals are provided which are adapted for engagement with the free marginal edges of each of the partitions 40. These seals may consist of fire brick columns, providing end seals 52 and top seals 53. The end seals may be supported by suitable roller mechanism 54, which latter is carried by the hoods. This mechanism permits free lateral movement of the end seals into engagement with and out of engagement from the partitions.

Preferably the ends of the partition are provided with median grooves 55 of a width sufficient to accommodate the free margins of the end seals. This permits nesting of the seals in the partitions and forms a gas tight joint between the partitions and hoods, which construction is especially desirable where pressure chambers are employed. The top seal 53 pends through an opening 56 in the hood crown, the seal being supported by a beam 57 mounted on said hood crown. An adjustable bolt 58, carried by the beam 57, is engaged with the top seal for controlling movement of the latter.

Figures 5, 12, 14:
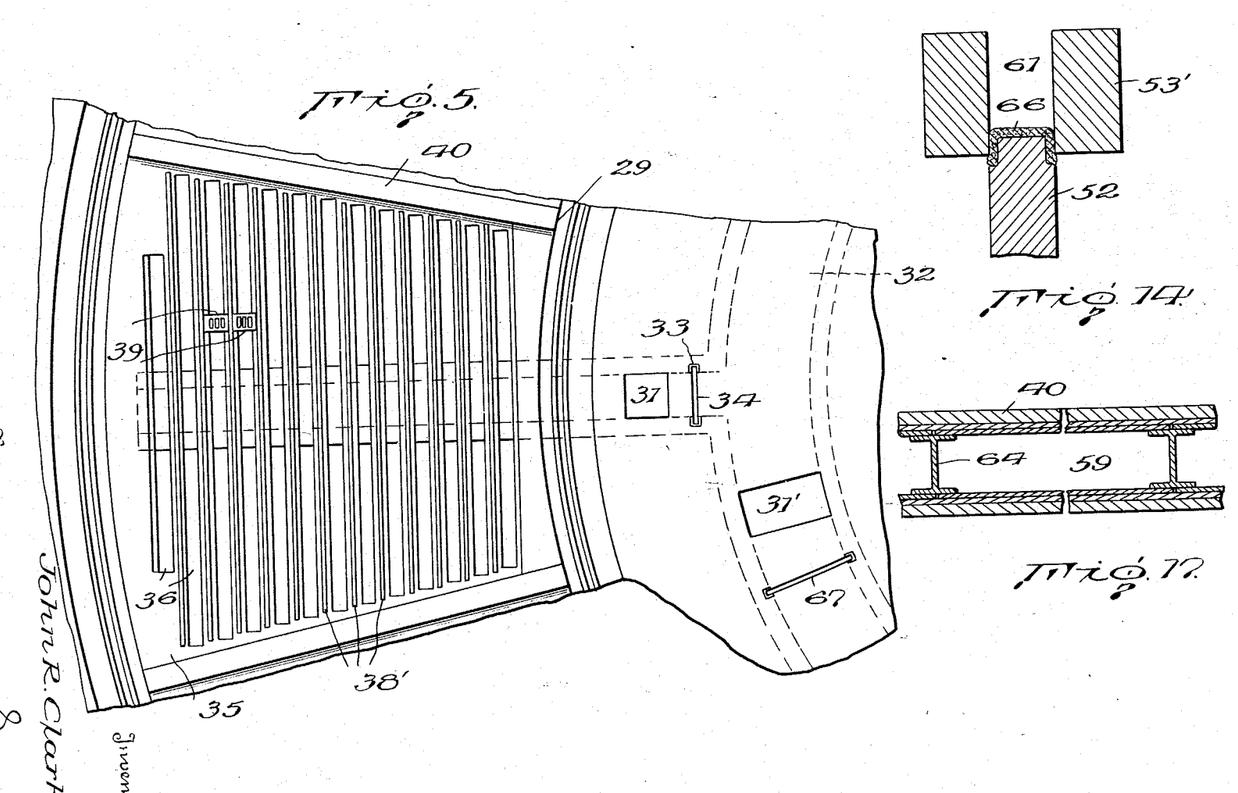
Fig. 5 is a detail fragmentary top plan view of one of the kiln chamber floors with most of the floor blocks removed, openings leading to the flues and flue tributaries being also shown.
Fig. 12 is a detail fragmentary horizontal sectional view taken on the line 12—12 of Fig. 11, looking in the direction of the arrows.
Fig. 14 is a detail fragmentary sectional view of the modified form of top and end seals shown in Fig. 13, illustrating the manner of engaging these seals at their ends.
Figure 15:
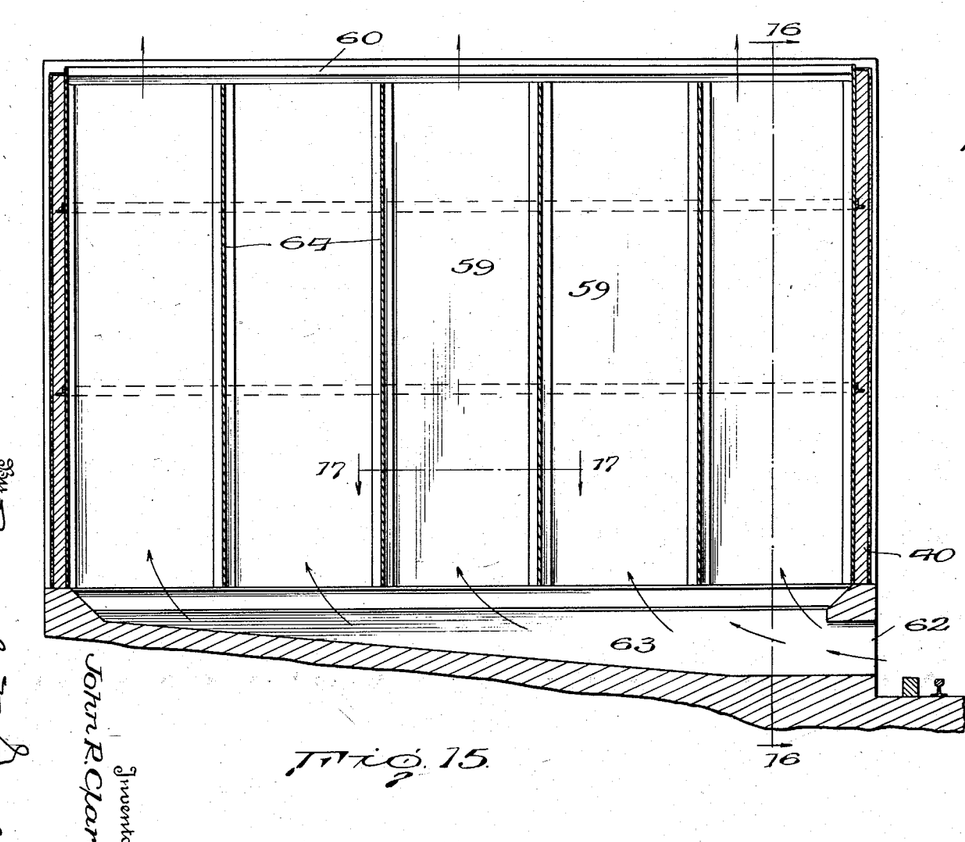
Fig. 15 is a vertical sectional view of a modified form of partition, the partition being hollow and having air inlet and outlet openings in its terminals.
Figure 16:
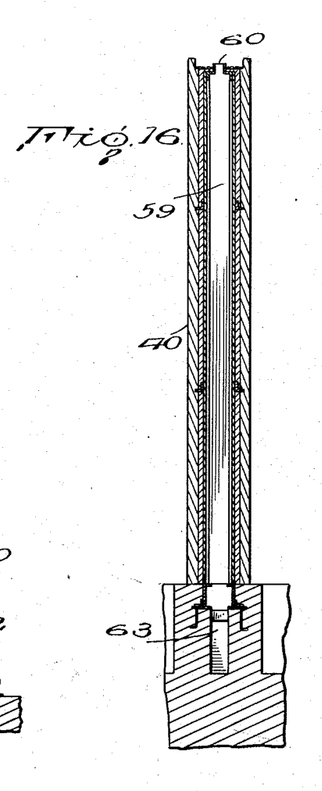
Fig. 16 is a transverse sectional view of the same taken on the line 16—16 of Fig. 15.
Figure 18:
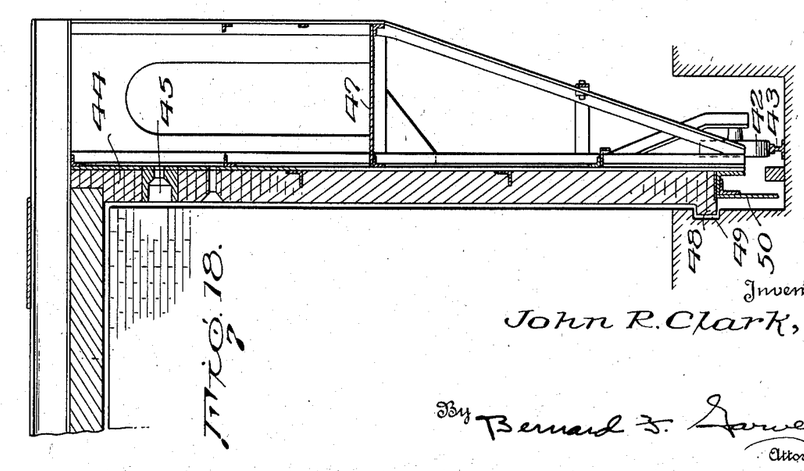
Fig. 18 is a fragmentary vertical sectional view taken through the side wall of the firing chamber, showing to advantage the heat induction and peep openings near the crown of the kiln.
Figure 19:
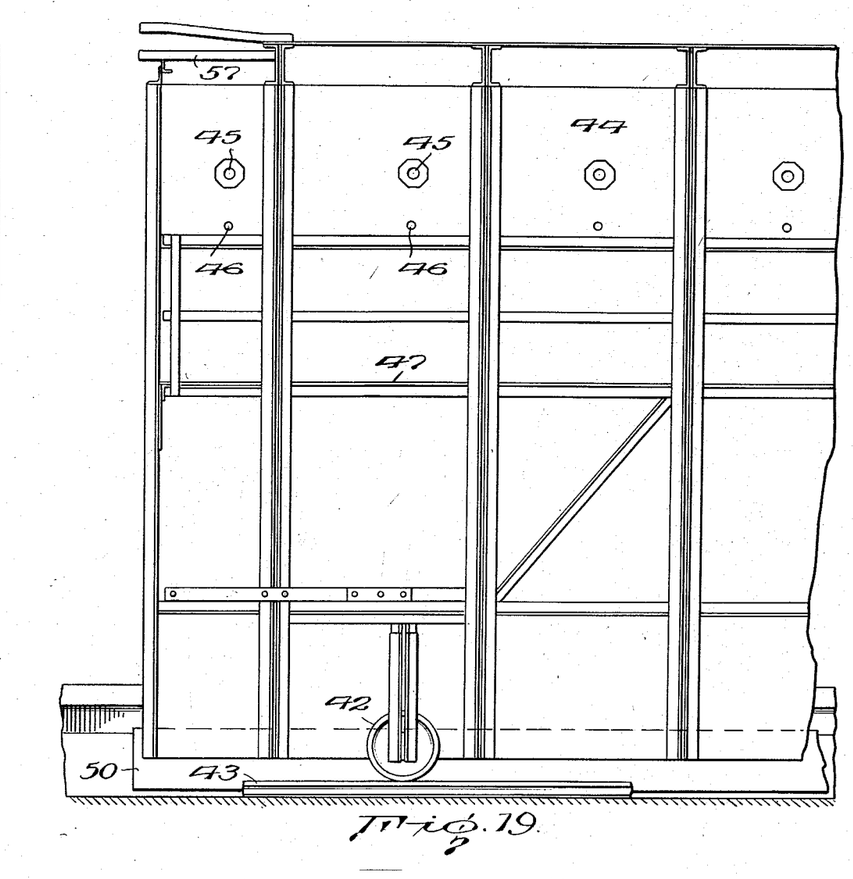
Fig. 19 is a fragmentary side elevational view of the same showing to advantage one of the roller supports for the hood.

If desired, instead of employing a solid partition wall, an air space may be formed centrally in the latter, as shown in Figs. 11 to 16, inclusive. In this form of invention, the partition designated 40' is open, as indicated at 59, through the center from top to bottom as well as from end to end. The walls of the opening are contracted at the top and has a mouth 60 issuing therefrom. The mouth is adapted for engagement in a slot 61 formed centrally in a top seal 53'. Except for the slot 61 this top seal is of the same construction as the seals 53. In a partition wall of this construction it is preferred to permit air to enter the space 59 from the bottom, at one end of the wall. In Fig. 15, I have shown an air inlet opening 62 which communicates with a channel 63 in the bottom of the wall. Preferably spacers 64 are mounted at intervals between the walls of the air space, the spacers being arranged vertically and extending from the top to the bottom of the wall. The air passing up through the wall is vented to the atmosphere through the mouth 60 and slot 61. In this form of invention both the end and top seals have their free ends countersunk in complemental recesses 55' formed in the ends and top of the partition. Furthermore, the bottom of each recess is equipped with mineral wool 65 or similar fireproof packing to effect a positive seal between the hood and partition. The top of the end seal is provided with packing 66 which engages the inner walls of the top seal, on the opposite sides of the slot 61, as shown in Fig. 14.

By use of the dampers 34 in the ducts 30 and 67 in the flue 32, a flexible system of transferring heat from one chamber to another is provided. It is possible, with this system, to operate a single chamber, if that should be found feasible and it is likewise possible to operate two or more of the chambers simultaneously. One or more chambers may serve to constitute a kiln; four being used at X; three at Y; and one at Z. It is thus seen that the continuous kiln 27 can in practice be used as three separate kilns at one time. Furthermore, by introducing the heat at the top of the firing chambers and causing it to be withdrawn through the floor of the chambers and then baffled into the chamber or chambers desired, transfer of heat is at all times within the complete control of the operator. In addition to the suction openings 31, in each of the ducts or tributaries leading to the flue 32, said flue is provided with corresponding openings 31' arranged in proximity to the dampers 67 and in which the suction fans 68 are engageable, as illustrated in Fig. 1. It is, of course, understood that as many of the suction fans 68 as desired may be simultaneously employed. The fans are portable and compact so as to be easily and quickly moved by manual power for application to the various suction openings.

Also upon reference to Fig. 1 of the drawings, it will be observed that the ware transporting belt 28 is positioned in one of the set and dry chambers. When in this position the flue dampers 67 are open from the cooling chamber on the opposite side of the kiln. This permits the suction of gases under influence of a suction fan 68, from said cooling chamber to said set and dry chamber, as indicated by the arrows. The hood for the set and dry chamber, is presently moved to the right, pending complete tiering of the brick. Upon completion of the tiering operation the ware transporter is retracted on a track 69 in the ware forming unit 26, pursuant to which the set and dry hood is moved into position over the tiered brick and the gases from the cooling chamber forced through the tiers of brick in the set and dry chamber. During this period the preheating chamber is receiving the hot gases from the adjacent firing chamber by reason of the fact that the suction fan for the preheating chamber is in operation and the flue damper between the firing and preheating chambers is open while the flue dampers at the ends of the firing and preheating chambers are closed. It is now manifest that the heated gases induced into the firing chamber through the openings 45 are withdrawn by the suction fan of the preheating chamber and circuited into said preheating chamber. The products of combustion from the preheating chamber may be vented through an opening in the crown of the hood or in any other conventional manner.

Operation of a plant and method in accordance with the teaching of the present invention has proven speedier in operation with consequent increase in manufacture and an improved ultimate product. The arrangement of the kilns, movability of the hoods and flexibility of transfer of heat insures uninterrupted operation of the plant.

It is of course to be understood that various changes may be made in the details of description, proportion and arrangement of parts within the scope of the claims hereto appended.

What is claimed is:

1. A kiln for use in the manufacture of brick and other clay products including a kiln floor divided into a plurality of brick treating zones each of which is provided with openings for heat induction, hoods arranged in batteries, each battery being engageable over a series of adjacent zones, the ends of the hoods being closed to provide chambers for the brick tiered on the kiln floor in said zones, firing means included in one chamber of each battery, and means for circuiting the heat from said firing chamber to the heat induction openings in the floor of another battery of chambers.

2. A kiln for use in the manufacture of brick and other clay products including a continuous circular kiln, a plurality of hoods arched over a sector of the kiln, each hood being movable for positioning over any part of the kiln, a turn table mounted within the confines of the kiln, ware forming mechanism carried by the turn table, means to feed the prepared clay to said mechanism, and means to transport the ware from said mechanism to the kiln, the transporting means being movable with the turn table.

3. In combination with an annular multi-part kiln floor provided with heat passageways, an annular heat conducting flue centrally of said kiln communicating with the kiln floor passageways, and controllable means in said flue arranged for intercircuiting of heat between said multi-part floor and flue.

4. A brick kiln including a continuous kiln floor partitions arranged at intervals on said floor, hoods movably mounted on opposite sides of the floor, arched over the floor and partitions and engageable with the latter.

5. A brick kiln including a continuous kiln floor, partitions arranged at intervals on said floor, hoods arched over the floor and partitions and movable on the floor for optional positioning over the partitions.

6. A brick kiln including a floor equipped with partitions, hoods mounted on the floor and movable thereover, and seals mounted in the hoods and movable into engagement with said partitions.

7. A brick kiln including a perforate kiln floor partitioned at intervals, hoods arranged over parts of the floor and engageable with said partitions, to provide chambers, certain of said hoods having openings near their crowns for the passage of heat therethrough for impingement with ware tiered on the kiln floor, a flue communicating with each chamber through the floor perforations, and suction means mounted in said flue and operable to draw the heat through the ware and through the floor perforations into the flue.

8. A brick kiln comprising a floor, walls arranged at intervals on the floor, hoods movably mounted on said floor, the hoods including means operable into engagement with the free margins of the walls to form seals.

9. A method of making brick which consists in connecting chambers in series and tiering green ware on the floors of the chambers, impinging upon the ware in one chamber of the series from the top thereof a heating medium, withdrawing the latter through the bottom of the chamber, and then transferring the heating medium to an adjacent chamber and impinging it against the ware of the latter chamber through its floor.

10. A kiln for use in the manufacture of brick including a continuous circular floor, walls arranged at intervals on the floor, a rail mounted in the floor on each side of the walls, hoods arched over the floor and walls and engaged with said rails to permit selective engagement of the hoods with the partitions.

11. A brick kiln including an annular perforate kiln floor, transversely extending partitions spaced at intervals along said floor, hoods arranged to move over the floor and engageable with said partitions whereby to provide the side walls and tops of chambers, certain of said hoods having openings near their crowns for the passage of heat therethrough for impingement with ware tiered on the kiln floor perforations, suction means mounted in communication with said flue and operable to draw the heat through the ware and through the floor perforations into the flue, dampers positioned at predetermined intervals in said flue to control heat transfer from one chamber to another.

12. A brick kiln comprising an annular floor, transversely extending partition walls dividing said floor into a plurality of partially formed chambers, a continuous track at each side of said floor, an arched hood movably supported on said tracks and provided with means for sealing it to said walls to form chambers, means to effect controlled heating of said kiln, and means extending along said track arranged to cooperate with said hood in any position on said tracks to seal said chamber.

13. A brick kiln comprising an annular floor, transversely extending partition walls dividing said floor into a plurality of partially formed chambers, a continuous track at each side of said floor, an arched hood movably supported on said tracks carrying means for selectively sealing it to said walls to form chambers, means to effect controlled heating of said kiln, means including a continuous trough filled with fluent material and extending along said track, and a blade carried by said hood to cooperate with said material for continuously sealing said chambers, with the hood in any position on said tracks.

14. A brick manufacturing plant comprising a plurality of stations including brick supporting floors and flue structures interconnecting said floors for handling the kiln gases whereby said stations are correlated to provide a system for a predetermined method of brick manufacture, said stations being designed to receive covers for selectively covering said stations for heat treating and burning said brick; portable covers; each of which comprises wall sections, a top and means to facilitate movement of said covers from a position covering the brick at one station to a position covering uncovered brick loaded at another station, each cover cooperating with one of said stations when in position at one of said stations to provide a kiln in which brick may be subjected to heat treatment and burning.

JOHN R. CLARK.